Sept. 16, 1969  A. STOPP  3,466,745
METHOD OF MAKING LAMINATED BUS BAR ASSEMBLY
Original Filed May 17, 1966  3 Sheets-Sheet 1

United States Patent Office 3,466,745
Patented Sept. 16, 1969

3,466,745
METHOD OF MAKING LAMINATED
BUS BAR ASSEMBLY
Alfred Stopp, Eberbach, Germany, assignor to Brown, Boveri & Cie Aktiengesellschaft, Mannheim-Kafertal, Germany
Continuation of application Ser. No. 550,861, May 17, 1966. This application Jan. 25, 1968, Ser. No. 700,649
Claims priority, application Germany, May 18, 1965, B 81,972; Jan. 21, 1966, B 85,490
Int. Cl. H01b 13/00
U.S. Cl. 29—624        2 Claims

ABSTRACT OF THE DISCLOSURE

The method of making laminated bus bar assemblies by stacking, gluing and baking a number of flat and planar conductor blanks with lateral terminal lugs, is improved by giving all of the punched blanks the same length and shape as well as the same number of identical terminal lugs. All but chosen ones of the lugs are subsequently removed, the remaining lugs being so selected as to form a linear array of equidistant lugs in the stack. An angular bus bar is produced either by bending a stack of such blanks or by bending the blanks individually before stacking and then shortening them to staggered differences in length.

My invention relates to planar electrical conductors. More particularly, it relates to a method for making a cable-tree or laminated bus bar assembly of planar conductors. This application is a continuation of my application Ser. No. 550,861, filed May 17, 1966, and now abandoned.

Where a great multiplicity of electrical conductors are required such as in switchboards, in electrical calculating and other type business machines and the like, the main connections are generally made by means of cable-tree assemblies. For efficiency in space consumption and other advantages to be derived therefrom, these connections, in situations where great multiplicities thereof are required, are frequently provided in the form of a laminated bus bar assembly comprising planar conductors, such conductors at times being quite thin, i.e. having a thickness of about a few tenths of a millimeter, plastic foils generally being provided to serve as insulating layers for the conductors.

Generally, in the construction of such laminated bus bar assemblies, the conductors are provided at respective intervals along the length of the assembly with connecting lugs for soldering thereto additional conductors or for connecting the planar conductors to terminals such as with screws and the like. Depending upon the particular design requirement, the assembly of these planar conductors may be straight and continuous or may be bent at an angle at one or more points along its length and the connecting lugs may also be bent in different directions as determined by the positions of the terminals to which they are to be connected. The connecting lugs of the respective planar conductors are generally arranged so that they are free from and not covered by each other.

Thus, a laminated bus assembly of planar conductors made from copper sheet may have a comblike appearance wherein the individual teeth of the comb which are the connecting lugs of the respective conductors are staggeredly spaced from each other a distance slightly greater than the thickness of the material constituting each respective conductor. Thus, in a comblike assembly of ten planar conductors, for example, ten leads are required which respectively differ in the arrangement of their connecting lugs.

Heretofore, in the production of such assemblies, a compound cutting die has been provided for each conductor. Thus, in a bus assembly comprising ten planar conductors, ten cutting dies would correspondingly be required. These cutting dies are arranged such that, after their operations are performed, there remains on each planar conductor, only the actually desired number of connecting lugs whose respective lengths in the direction extending from a longitudinal edge of the conductor progressively increase by an increment of the thickness of an insulated planar conductor. In this production method, because of the great number of dies required and because of the need to subdivide the conductors into a large number of production lots, the manufacturing efficiency is poor and correspondingly uneconomical.

Another disadvantage of the aforementioned production method occurs when assembling the bus bar from conductors whose connecting lugs have already been bent into desired positions. In this situation, the stacking of the planar conductors in a mounting fixture in the actual production of the assembly, frequently encounters difficulties because of the high degree of precision which may be required.

In view of the foregoing, the considerable expenditure of time in the preparation for the punching of the several variants of the planar conductors, the high cost of tools for the many compound cutting dies needed, and the requirements of high precision in the assembling and stacking of the conductors to form the bus assembly, the production becomes excessively expensive and uneconomical.

Accordingly, it is an object of my invention to provide a method for producing a laminated bus assembly of planar conductors which is economical as compared to known methods for the same purpose.

It is another object to provide a method for producing a bus assembly of planar conductors in accordance with the preceding object in which a high degree of precision is readily attained.

These objects are achieved by providing a method for producing a cable assembly comprising several plastic-lining insulated glued and baked planar conductors. In this method, all of the conductors are first identically punched out, each of the conductors being provided at this point with a greater number of connecting lugs than will be required in the final bus assembly and wherein the lengths of most of the respective lugs have lengths greater than will be required in the final assembly. The superfluous connecting lugs are then selectively removed from the individual planar conductors and the assembly thereof is then packaged (stacked) and suitably baked.

The punched planar conductors have the appearance, therefore, of several groups of connecting lugs of differing respective widths and lengths, such as, for example, covering half of the length of the planar conductors. The individual groups of connecting lugs in turn, are always arranged such that between the connecting lugs, a given spacing exists which is substantially greater than the distance which permits an arcing, i.e. a sparkover voltage. The width of the copper sheet from the conductors are punched is suitably chosen such that it is substantially equal to the width of the conductor and the length of the longest connecting lug. Consequently, the length of the connecting lugs and the width of the conductor are taken into consideration in the selection of the cutting die. Thus, for each basic configuration of a planar conductor, only one cutting die is required which is designed to take into account all variants that are encountered relative to the number and arrangement of the connecting lugs.

In a further feature of the invention, each planar conductor is separately punched out in sequence from a copper sheet. The extent of the cutting stroke of the die is thereat balanced such that at each stroke a perpendicularly disposed connecting lug and one or several perpendicular soldering lugs are provided on the conductor. The planar conductors are then stacked with the lugs in a staggered array and in such stacked form are pressed, glued and baked together. The individual cutting strokes of the die are chosen such that a cable-tree or bus-bar assembly results in which the respective spacings between the connecting lugs and between the soldering lugs exceed the arcing or sparkover voltage distances. The connecting lugs of the assembly made by the method according to the invention have the advantage of being of a uniform size.

The method according to the invention also provides for the bending of the conductors as required prior to the baking, i.e. the individual insulating foil-lined planar conductors are already in the required bent or angle-form prior to their packaging and baking. To this purpose, one end of the outermost planar conductor is flat-clamped in the bending direction and the other end of the conductor is bent a given amount as determined by a suitable stop. With the respective sequentially adjacently occurring planar conductors in the final assembly, the bending direction is shifted each time such that the lengths of the respective conductors are shortened by an amount equal to the thickness of a conductor including its insulation. Alternatively, the assembly may be clamped at one end thereof after it has already been packaged in the bending direction, such clamping, of course, being effected prior to the baking step. At the same time, the other end of the assembly is bent as far as required, suitably determined by a stop, and then trimmed to the desired length. In this latter connection, it is to be realized that each adjacent conductor proceeding from the innermost to the outermost one in the angularly bent assembly has to be progressively longer than the specfied length in order that the assembly be of such specified length throughout. The assembly then is pressed and baked as described hereinabove. As a result, the planar conductors comprising the assembly are made to firmly adhere to each other.

A particular advantage flowing from the method according to the invention is the fact that it affords bending, perforating and cutting to desired length of the connecting lugs on the planar conductors after their packaging and baking has been completed. As a result of such after-operation or treatment, the stacking or bunching of the planar conductors preparatory to their packaging and baking, can be performed with greater permissible tolerances. In addition, the stacking and insulating of the conductors is likewise made simpler since now, except for any required bending of the conductors, only planar and not deformed conductors are employed.

In the final step in the method, the edges of the planar conductor cable assembly are coated with a cast resin and sealed. The insulating foils which may protrude at the edges of the conductors are thereby fixed in place and consequently sparkovers and arcings between adjacent conductors are rendered substantially impossible.

Instead of the heretofore employed single wires, the laminated bus assembly according to the invention can be assembled with a relatively efficient space utilization. The assembly is of low inductance, high capacitance, quite flat in configuration, and space saving. They are particularly suited for switchboard, calculating and business machines and other applications where bus assemblies are required.

The above-mentioned and more specific objects and features of my invention will be apparent from, and will be mentioned in, the following description of a method of making a planar cable assembly and a cable assembly produced thereby, shown by way of example in the accompanying drawing.

In the drawing, FIG. 1 shows a view in end elevation of an illustrative embodiment of a planar conductor blank employed to form the bus assembly;

Figure 1:
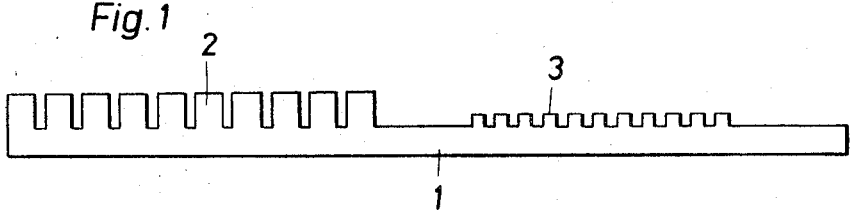

Referring now to FIG. 1, there is shown therein a planar conductor blank 1 comprising a group of like spaced connecting lugs 2 extending therefrom which may suitably be employed as screw connections to terminals and a group of like smaller spaced connecting lugs which may suitably serve as soldering lugs. Both forms of connecting lugs are provided on the planar conductor blank such that in accordance with the configuration of the conductor in FIG. 1, there may finally be produced a laminated bus assembly comprising ten inputs and ten outputs. The configuration of the conductor in FIG. 1 is that which obtains during the first step of the method.

Figure 2:
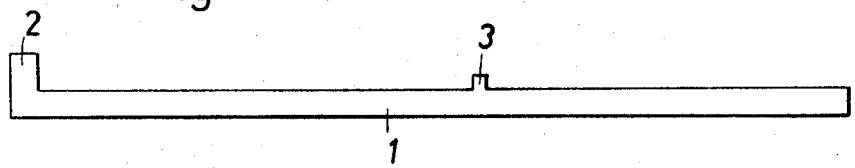
FIG. 2 shows a first modification of the blank shown in FIG. 1 to produce an outermost planar conductor in the assembly.
Figure 3:
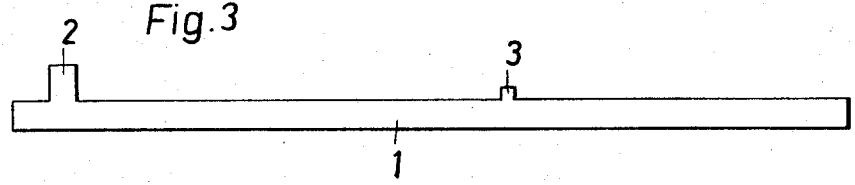
FIG. 3 shows a second modification of the blank shown in FIG. 1 to produce the planar conductor adjacent the conductor of FIG. 2 in the assembly.

In FIGS. 2 and 3, the further development of the individual planar conductors can be seen. Thus the next step in the method after the punching out of the blank of FIG. 1 is to remove the superfluous lugs. Thus, the form shown in FIG. 2 is that of the conductor which is to be the outermost conductor in a bus assembly and the form shown in FIG. 3 is that of the planar conductor which is to be the next to the outermost conductor in the assembly. Thus, in the outermost planar conductor 1 in FIG. 2, after the removal of all of the superfluous lugs, the endmost screw connection 2 and the correspondingly endmost soldering connection 3 of each group remains. FIG. 3 shows the further step in that the next to the outermost conductor 1 has left thereon a one-step staggered screw connection lug 2 and a correspondingly one-step staggered soldering connecting lug 3.

The superfluous connecting lugs are suitably removed by a single transverse cutting die. The cutting away of these superuuous lugs may be individually effected on a die equipped with a feeding device. The dimensions of this transverse cutting die are suitably so chosen that with one operating stroke, the smallest required distance between the connecting lugs can be effected. If a greater distance between connecting lugs are desired, several operating strokes may be necessary.

Figure 4:
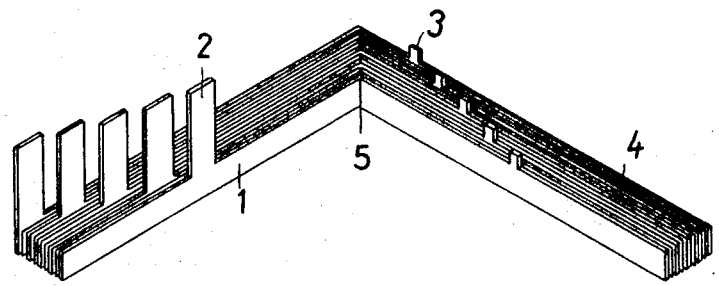
FIG. 4 is a three-dimensional view showing the stacked assembly of planar conductors, the assembly being bent at a right angle.

In FIG. 4 there is shown a bus assembly 4 comprising five stacked and baked planar conductors 1 which had been bent at a right angle 5 after the stacking of the conductors but prior to the gluing and baking of the cable assembly. The screw connections 2 therein are still incompleted and each have the maximal length, i.e., the length which will be required of the innermost conductor. The soldering connections 3, however, are in completed form; however, since no further machining or other operation thereon is required.

Figure 5:
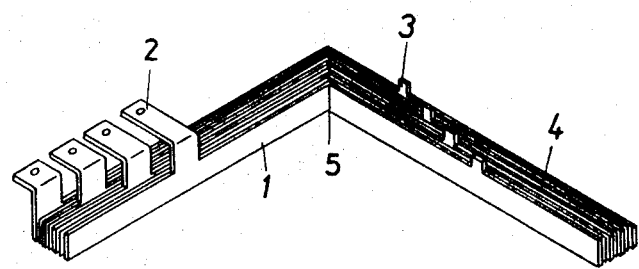
FIG. 5 is a view similar to that of FIG. 4 showing a further modification of the assembly of FIG. 4.

In FIG. 5, there is shown a planar cable assembly 4 comprising four stacked, glued and baked planar conductors 1 bent at a right angle 5. The screw connections 2 therein have been bent, trimmed and perforated to their final desired form. The soldering lugs 3 have not been further machined or otherwise operated upon. FIG. 5 thus shows the end-product of the method according to the invention.

Figure 6:
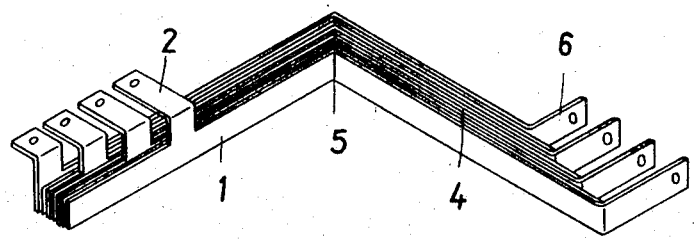
FIG. 6 is a view similar to that of FIG. 4 showing another type of modification of the assembly.

In FIG. 6, there is shown a further step in the post-finishing of the planar bus bar assembly. In this figure, the soldering lugs 3 of cable assembly 4 in FIG. 5 have been removed. In place thereof, the right ends of the planar conductors 1 have been bent at right angles and perforated to provide screw connections 6. The screw connections 2 are the same as those shown in the assembly depicted in FIG. 5.

Figure 7:
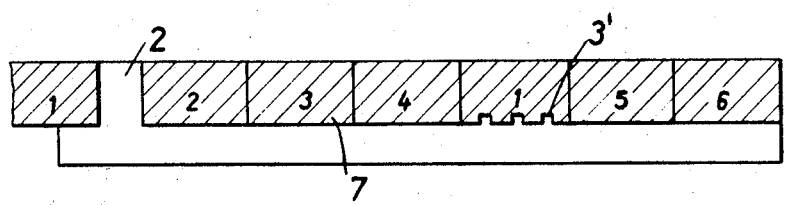
FIG. 7 is an end-elevational view similar to that of FIGS. 2 and 3 which also depicts the producing of the planar conductor.

In FIG. 7, there is shown a planar conductor 7 having a connecting lug 2 to be used as a screw connection and a group of lugs 3' which are to be used for soldering or welding connections. Connecting lug 2 is again chosen to have a length which is equal to the required longest length of a screw connecting lug. Connecting lug 2 and soldering or welding lug group 3' are cut out of the full width of the material, i.e., copper sheet, suitably by means of a universal tool. The sequence of operations is determined on a feed rail and template which is especially made for the desired planar conductor. According to the diagram depicted in FIG. 7, connecting lug 2 is punched free as a result of several operating strokes of the cutting die as shown by the hatched areas number 1–6 respectively. Concurrently, the soldering lug group 3' is punched out with another die. The two dies may suitably be combined in a single structure.

With a suitable arrangement, it is possible to determine the rhythm of the operating strokes and with a suitable locking mechanism, it may be arranged that only one die acts at one time. The die for punching out connecting lug 2 is chosen to have a width such that the minimum permissible distance between two staggered connecting lugs of adjacent planar conductors in the final assembly is maintained. It is seen, of course, that if a greater than such minimum distance is to be maintained, several operating strokes of the die would be required.

The die for punching out the soldering lug groups such as group 3' is analogously designed as the cutting die for providing the connecting lugs 2. However, it is suitably made in several variants to enable the producing of either single or groups of multiple soldering connections.

Figure 8:
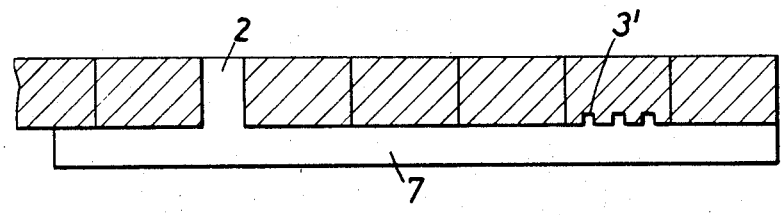
FIG. 8 is a view similar to that of FIG. 7 showing the producing of a planar conductor to be placed against that of FIG. 7 in an assembly.
Figure 9:
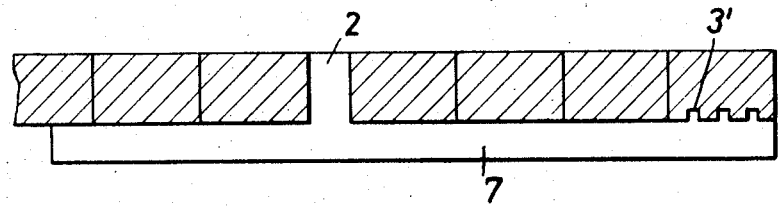
FIG. 9 is a view similar to that of FIGS. 7 and 8 showing the producing of a planar conductor to be placed against that of FIG. 8 in an assembly.

FIGS. 8 and 9 show further planar conductors which are to be combined in the stack with the planar conductor shown in FIG. 7. In the structures shown in FIGS. 8 and 9, the next succeeding conductors are shown with the corresponding staggering of connecting lugs 2 and soldering lug groups 3' respectively.

After the assembling and processing of the conductors of FIGS. 7 to 9, provided for a particular bus assembly, there results the assembly shown in FIGS. 4 to 6. The assembly has, after stacking but prior to the gluing together and baking of the planar conductors of which it is comprised, been bent into right angle 5. Of course, using the planar conductors of FIGS. 7 to 9, the soldering connections on each of the conductors would be of the group type 3' rather than individual connections 3.

The method according to the invention is particularly advantageously employed in the situation where it is important to have self-supporting and low inductance or high capacitance conductors.

Of course, the bus assemblies according to this invention are of a particularly flat, space-saving design, and, because of their efficient space utilization, have many advantages as compared to the heretofore employed single conductors.

It will be obvious to those skilled in the art, upon studying this disclosure, that methods of making a bus assembly according to my invention, permit of a great variety of modifications and hence can be given embodiments other than those particularly illustrated and described herein, without departing from the essential features of my invention within the scope of the claims annexed hereto.

I claim:
1. In the method of making a laminated bus bar assembly by punching out a plurality of flat and planar conducting blanks each having terminal lugs extending perpendicularly from one longitudinal edge of the blank, and stacking and gluing and baking said blanks together to form said assembly, the improvement which comprises punching all of said punched blanks with same length and shape as well as the same number of identical lugs, and subsequently removing from said respective blanks all but chosen ones of said lugs, said chosen lugs of said respective blanks being selected to form a linear array of equispaced lugs when said blanks are stacked together, and bending a portion of the blanks respectively in a direction substantially perpendicular to the original plane of the respective blanks so as to thereby shape the bus bar assembly to a substantially right angular configuration, and which further comprises bending each individual conductor blank to permanently angular shape prior to stacking, and subsequently shortening the lengths of the individual blanks for uniform over-all length of the resulting angular bus bar assembly, whereby the lengths of the respective stacked blanks progressively increase from the innermost to the outermost blank of the angular stack.

2. In the method of making a laminated bus bar assembly by punching out a plurality of flat and planar conducting blanks each having terminal lugs extending perpendicularly from one longitudinal edge of the blank, the lugs of each blank forming two longitudinally spaced groups, and stacking and gluing and baking said blanks together to form said assembly, the improvement which comprises punching all of said punched blanks with same length and shape as well as the same number of identical lugs, and subsequently removing from said respective blanks all but chosen ones of said lugs, said chosen lugs of said respective blanks being selected to form a linear array of equispaced lugs when said blanks are stacked together, and bending a portion of the blanks respectively in a direction substantially perpendicular to the original plane of the respective blanks so as to thereby shape the bus bar assembly to a substantially right angular configuration, and which further comprises the step of bending the lugs of one group to permanently angular shape after said gluing and baking, and then trimming said latter lugs to progressively different respective lengths so as to align the outermost respective edges of said latter lugs substantially along a line parallel to the longitudinal direction of the blanks.

References Cited

UNITED STATES PATENTS

| | | |
|---|---|---|
| 2,929,964 | 3/1960 | Rhys-Jones. |
| 3,118,016 | 3/1964 | Stephenson _____ 174—68.5 |
| 3,264,403 | 8/1966 | Erdle. |

FOREIGN PATENTS 111,150   6/1964   Czechoslovakia.

OTHER REFERENCES

"Laminated and Molded Bus Bars for Power Distribution," Technical Bulletin B–1, published by Eldre Components, Inc., 1239 University Ave., Rochester, N.Y. 14607.

DARRELL L. CLAY, Primary Examiner

U.S. Cl. X.R.

174—72, 117